United States Patent
Langford-Wood (10) Patent No.: US 9,909,891 B2
(45) Date of Patent: Mar. 6, 2018

(54) DISPLAY OF ROUTES TO BE TRAVELLED BY A MARINE VESSEL

(71) Applicant: NAVICO HOLDING AS, Egersund (NO)

(72) Inventor: Robert Langford-Wood, Southampton (GB)

(73) Assignee: NAVICO HOLDING AS, Egersund (NO)

( * ) Notice: Subject to any disclaimer, the term of this patent is extended or adjusted under 35 U.S.C. 154(b) by 315 days.

(21) Appl. No.: 13/966,668

(22) Filed: Aug. 14, 2013

(65) Prior Publication Data

US 2015/0051836 A1   Feb. 19, 2015

(51) Int. Cl.
| | |
|---|---|
| *G01C 21/36* | (2006.01) |
| *G01C 13/00* | (2006.01) |
| *G01C 21/00* | (2006.01) |
| *G08G 3/00* | (2006.01) |

(52) U.S. Cl.
CPC ............ *G01C 21/36* (2013.01); *G01C 13/00* (2013.01); *G01C 21/00* (2013.01); *G08G 3/00* (2013.01)

(58) Field of Classification Search
CPC . G01C 21/203–21/222; G01C 21/3676; G01C 21/00–21/3697; G01C 21/20–21/22; G01C 21/36; G01V 1/3808; G01V 1/3817–1/3835; G06T 11/20–11/206
See application file for complete search history.

(56) References Cited

U.S. PATENT DOCUMENTS

| | | | |
|---|---|---|---|
| 4,829,493 A | 5/1989 | Bailey | |
| 4,879,697 A | 11/1989 | Lowrance et al. | |
| 5,025,423 A | 6/1991 | Earp | |
| 5,191,341 A | 3/1993 | Gouard et al. | |
| 5,537,380 A | 7/1996 | Sprankle, Jr. et al. | |
| 6,225,984 B1 | 5/2001 | Crawford | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,633,810 B1 * | 10/2003 | Qureshi et al. | ............... 701/467 |

(Continued)

FOREIGN PATENT DOCUMENTS

EP     1772789 A1    4/2007

OTHER PUBLICATIONS

"Chart Work—SAR Search Patterns." Chart Work. OpenCPN, n.d. Web. Oct. 21, 2012. <http://web.archive.org/web/2012023053142/http://opencpn.org/ocpn/node/196>.*

(Continued)

*Primary Examiner* — Jennifer To
*Assistant Examiner* — Liang Li
(74) *Attorney, Agent, or Firm* — Nelson Mullins Riley & Scarborough LLP (57) ABSTRACT

Various implementations described herein are directed to a method for displaying a route to be travelled by a marine vessel on a computer screen. In one implementation, the method may include receiving a command to display a predetermined navigation pattern corresponding to the route, receiving a request to place a center of turn on a first geographical location, and displaying the predetermined navigation pattern based on the center of turn on the computer screen.

7 Claims, 7 Drawing Sheets

(56) References Cited

U.S. PATENT DOCUMENTS

| | | | |
|---|---|---|---|
| 6,761,692 B2 | 7/2004 | Angelsen et al. | |
| 6,816,782 B1 | 11/2004 | Walters et al. | |
| 7,002,579 B2 | 2/2006 | Olson | |
| 7,236,426 B2 | 6/2007 | Turner et al. | |
| 7,268,703 B1* | 9/2007 | Kabel et al. | 340/984 |
| 7,430,461 B1 | 9/2008 | Michaels | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,380,366 B1 | 2/2013 | Schulte et al. | |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0089794 A1* | 4/2006 | DePasqua | G01C 21/203 701/532 |
| 2006/0119585 A1 | 6/2006 | Skinner | |
| 2006/0224940 A1 | 10/2006 | Lee | |
| 2007/0162207 A1* | 7/2007 | Shimo et al. | 701/42 |
| 2008/0126935 A1 | 5/2008 | Blomgren | |
| 2008/0133131 A1* | 6/2008 | Poreda | G01C 21/203 701/418 |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0192703 A1* | 7/2009 | Hess | G01C 21/3461 701/532 |
| 2009/0249247 A1 | 10/2009 | Tseng et al. | |
| 2009/0251366 A1* | 10/2009 | McClure et al. | 342/357.09 |
| 2009/0271722 A1* | 10/2009 | Park | G01C 21/3614 715/765 |
| 2009/0287409 A1 | 11/2009 | Summers | |
| 2010/0080082 A1 | 4/2010 | Betts et al. | |
| 2010/0094548 A1* | 4/2010 | Tadman et al. | 701/209 |
| 2010/0131133 A1* | 5/2010 | Koda et al. | 701/21 |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2013/0007665 A1 | 1/2013 | Chaudhri et al. | |
| 2015/0066356 A1* | 3/2015 | Kirsch | G01C 21/3664 701/425 |

OTHER PUBLICATIONS

Kusch, Adam. "SearchPatterns Pro Air". App Store. Apple, Feb. 14, 2013. Web. <http://itunes.apple.com/us/app/searchpatterns-pro-sea/id574316324?mt=8>.*

PCT International Search Report and Written Opinion; PCT/IB2013/060285; dated Feb. 18, 2014.

PCT International Search Report and Written Opinion; PCT/US2013/047869; dated Oct. 21, 2013.

PCT International Search Report and Written Opinion; PCT/US2013/048177; dated Oct. 21, 2013.

PCT International Search Report and Written Opinion; PCT/US2013/048129; dated Oct. 17, 2013.

PCT International Search Report and Written Opinion; PCT/US2013/047926; dated Oct. 11, 2013.

PCT International Search Report and Written Opinion; PCT/US2013/047645; dated Sep. 27, 2013.

PCT International Search Report and Written Opinion; PCT/IB2014/063905; dated Jan. 30, 2015.

Voyages; Wessex Archeology; Jul. 5, 2008; http://www.wessexarch.co.uk/projects/marine/alsf/englands_shipping/data/voyages.html.

DKart Software Presentation; Morintech; 2004; http://www.ramona.se/us/downloads/dKart_Functions_2004.ppt.

Furuno NavPilot 711 Product Detail Website visited Aug. 18, 2016 http://www.furunousa.com/Products/ProductDetail.aspx?product—NAVPILOT+711.

* cited by examiner

DISPLAY OF ROUTES TO BE TRAVELLED BY A MARINE VESSEL

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Marine autopilot systems provide advantages to vessel users. Autopilot systems save time and effort on the part of the user, and also increase the precision of vessel steering. Autopilot systems are especially useful for repetitive navigation tasks, such as steering back and forth to search an area. Current autopilot systems may provide options to steer in a straight line indefinitely or to steer according to waypoints specified by the user. A vessel user must remain vigilant to avoid obstacles or dangerous waters while the autopilot steers the vessel.

Autopilot systems may be equipped with or connected to a computer display for providing information to the user, such as navigation data. This data may include maps, sonar or radar data, current vessel bearing, or historical track of the vessel plotted on a map.

SUMMARY

Various implementations described herein are directed to a method for displaying a route to be travelled by a marine vessel on a computer screen. In one implementation, the method may include receiving a command to display a predetermined navigation pattern corresponding to the route, receiving a request to place a center of turn on a first geographical location, and displaying the predetermined navigation pattern based on the center of turn on the computer screen.

Various implementations described herein are also directed to a non-transitory computer-readable medium having stored thereon computer-executable instructions which, when executed by a computer, cause the computer to: receive a command to display a predetermined navigation pattern corresponding to a route to be travelled by a marine vessel, receive a request to place a center of turn on a first geographical location, and display the predetermined navigation pattern based on the center of turn on a computer screen.

Various implementations described herein are also directed a method for displaying a route to be travelled by a marine vessel on a computer screen. In one implementation, the method may include receiving a command to generate an outline on or proximate a first geographical location. The outline is configured to contain a predetermined navigation pattern that corresponds to the route. The method may further include displaying the outline on the computer screen, receiving a command to display the predetermined navigation pattern inside the outline, and displaying the predetermined navigation pattern inside the outline on the computer screen.

Various implementations described herein are also directed a non-transitory computer-readable medium having stored thereon computer-executable instructions which, when executed by a computer, cause the computer to: receive a command to generate an outline on or proximate a first geographical location. The outline is configured to contain a predetermined navigation pattern that corresponds to a route to be travelled by a marine vessel. The computer-executable instructions are further configured to display the outline on a computer screen, receive a command to display the predetermined navigation pattern inside the outline, and display the predetermined navigation pattern inside the outline on the computer screen.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

The following paragraphs provide a brief summary of various implementations described herein. Various techniques and technologies described herein may be implemented in a multi-function display (MFD) disposed on a marine vessel operated by a user. In one implementation, the multi-function display (MFD) receives a center of turn from a user. The center of turn is the geographical reference point for a predetermined navigation pattern to be travelled by the vessel. The MFD then receives a command from the user to generate the predetermined navigation pattern around the center of turn. The MFD then displays the predetermined navigation pattern.

In another implementation, the MFD receives a command from the user to generate an outline in which a predetermined navigation pattern is to be displayed. The MFD then displays the outline on the MFD. The MFD then receives a command from the user to generate the predetermined navigation pattern within the outline. In response, the MFD displays the predetermined navigation pattern inside the outline.

One advantage of various implementations described herein is to allow the user to view and change the route that the vessel may follow in the future. In this manner, the user can determine if the future route to be travelled by the vessel is acceptable. The user may avoid collisions or dangerous waters ahead of time by adjusting the route. The vessel may be steered along this route with an autopilot system, or steered manually by the user. In addition, various implementations described herein provide a method for easily creating complex routes.

One or more implementations of various techniques and technologies for displaying a route to be travelled by a marine vessel will now be described in more detail with reference to FIGS. 1-7 in the following paragraphs.

Various technologies and techniques described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
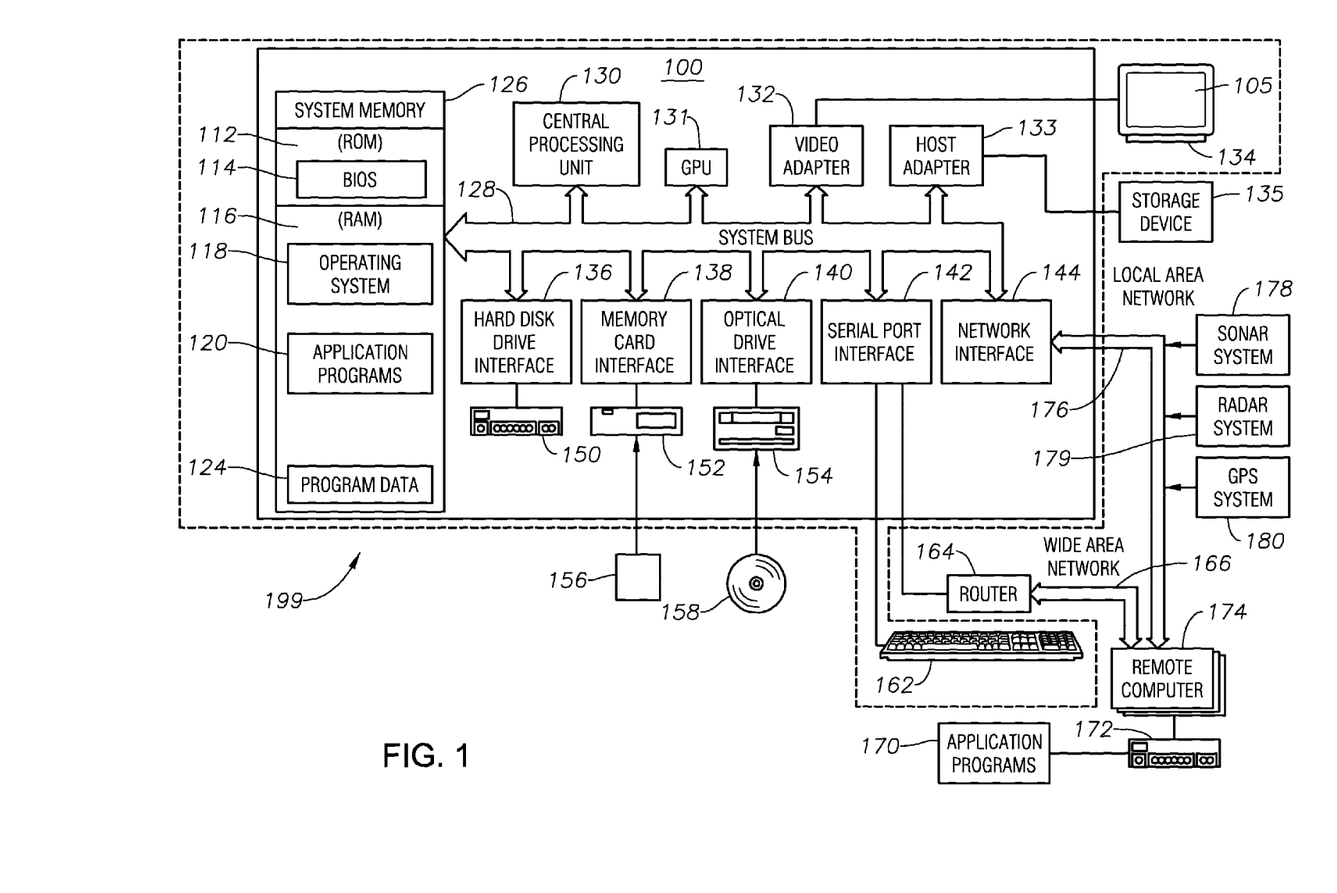
FIG. 1 is a block diagram of a multi-function display and various components contained therein in accordance with implementations described herein.

FIG. 1 illustrates a schematic diagram of a multi-function display 199 having a computing system 100 in which the various technologies described herein may be incorporated and practiced. The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 may include a microprocessor, a microcontroller, a processor, a programmable integrated circuit, or a combination thereof. The CPU 130 may comprise an off-the-shelf processor such as a Reduced Instruction Set Computer (RISC™), or a Microprocessor without Interlocked Pipeline Stages (MIPS™) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a display 105. The display 105 may be a touch screen. A touch screen can be sensitive to heat or touching (now collectively referred to as a "touch screen").

The system bus 128 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide nonvolatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The remote computers 174 can also include hard disks 172 that store application programs 170.

In certain implementations, various techniques, including the flow diagram, described herein can be implemented by a plurality of executable instructions stored in RAM. Alternatively, the plurality of executable instruction can be stored in the hard disk 150, or removable computer-readable media such as memory card 156 or optical media 158 until needed for execution.

A number of program modules may be stored on the hard disk 150, memory card 156, optical disk 158, ROM 112 or RAM 116, including an operating system 118, one or more application programs 120, and program data 124. The application programs 120 may include various mobile applications ("apps") and other applications configured to perform various methods and techniques described herein. The operating system 118 may be any suitable operating system that may control the operation of a networked personal or server computer.

A user may enter commands and information into the computing system 100 through input devices such as buttons 162. Other input devices may include a microphone (not shown) or through the display 105 if it is a touch screen. These and other input devices may be connected to the CPU 130 through a serial port interface 142 coupled to system bus 128, but may be connected by other interfaces, such as a parallel port, game port or a universal serial bus (USB).

Certain implementations may be configured to be connected to a sonar system 178, radar interface 179, and GPS system 180. The sonar system 178, radar interface 179, and GPS system 180 may be connected via the network interface 144. The computing system 100, the monitor 134, the display 105, and the buttons 162 may be integrated into a console, forming a multi-function display ("MFD") 199.

Figure 2:
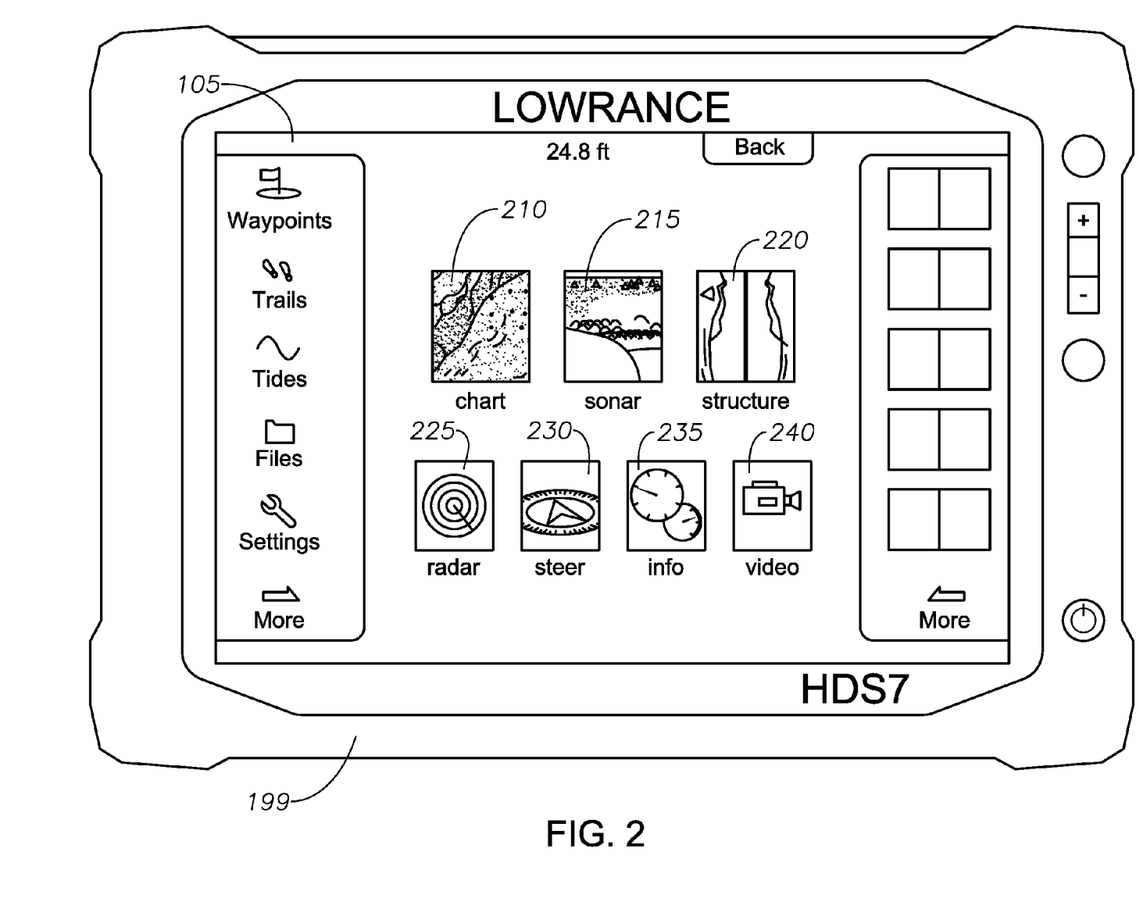
FIG. 2 illustrates a schematic diagram of a multi-function display displaying a graphical user interface.

FIG. 2 illustrates the multi-function display 199 in accordance with various implementations described herein. The MFD 199 includes the display 105. The display 105 may be a touch screen for user input, or the MFD 100 may be equipped with other input devices, such as a mouse or keyboard (not shown). The display 105 may display icons 210-240 to provide the user with a selection of options and programs available on the MFD 199. When selected, icon 210 may cause the MFD 199 to display navigation charts on display 105. The navigation chart may be made up of a number of layers, each containing different types of navigation data.

The terms "overlay" and "layer" in the context of navigation charts may be used interchangeably. Computer displayed navigation charts are typically made up of layers, each of which may or may not be displayed based on the user's preference. The base layer is typically a geographical map showing water and land. Each layer has a different type of geographically referenced information contained in it. For example, one layer may contain radar data from near the vessel, while another layer may contain sonar data from beneath the vessel. Since the two would overlap on a navigation chart, a user may choose to display only one of these layers at a time or both at the same time.

Selection of icon 215 may cause the MFD 199 to display sonar information on display 105. Selection of icon 220 may cause the MFD 199 display data regarding geological structure on display 105. Selection of icon 225 may cause the MFD 199 to display radar information on display 105. Selection of icon 230 may cause the MFD 199 to display steering information such as current bearing or latitude and longitude coordinates on display 105. Selection of icon 230 may also initiate setup of a new navigation route for a vessel to follow. Setup of a new navigation route may begin process 300 or 500 or may allow the user to select between the two processes. Selection of icon 235 may cause the MFD 199 to display configuration information on display 105. Selection of icon 240 may cause the MFD 199 to provide options to record or view video on display 105.

Figure 3:
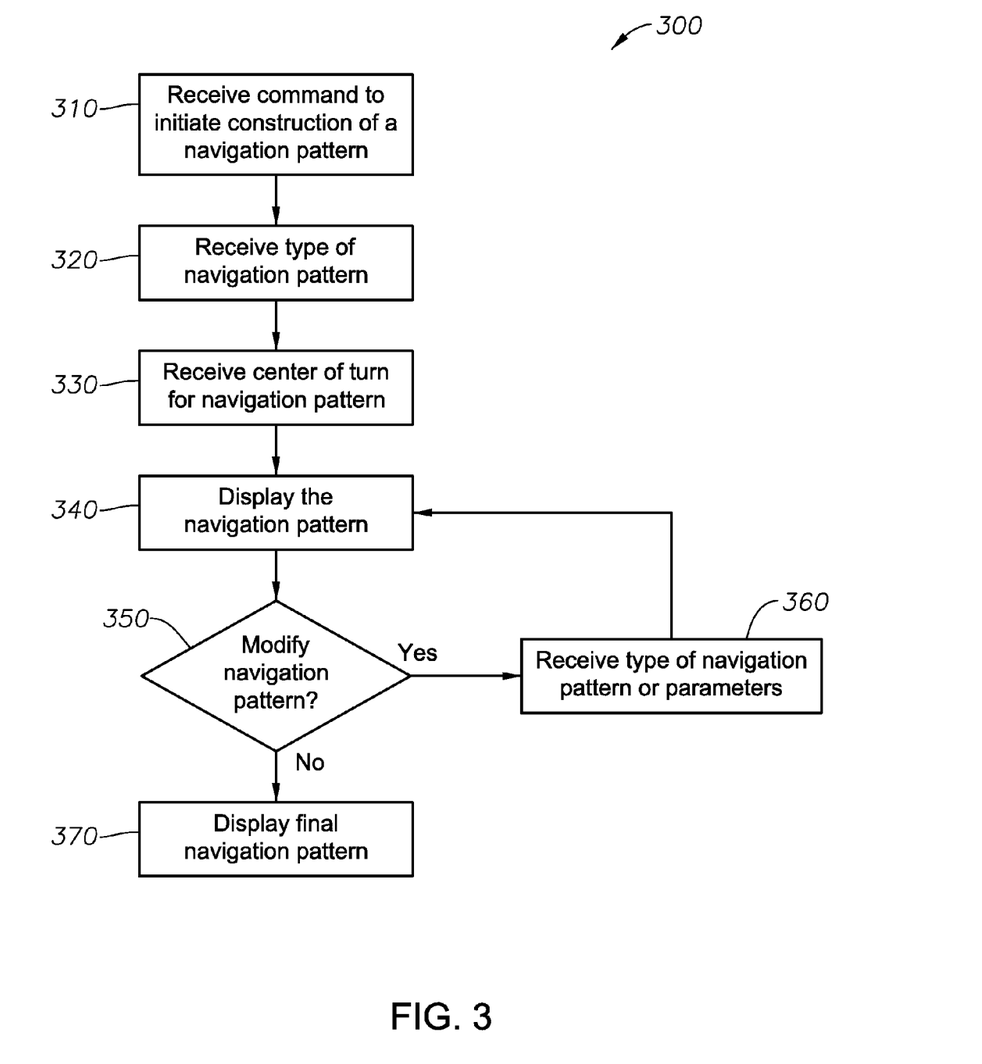
FIG. 3 is a flow diagram for creating and displaying a navigation pattern in accordance with implementations described herein.

FIG. 3 illustrates the process 300 for displaying a navigation route to be travelled by a marine vessel in accordance with one implementation described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 310, the MFD 199 receives a command from the user to initiate construction of a navigation pattern that corresponds to a navigation route that can be travelled by the marine vessel. The navigation pattern may be used by either the user or an autopilot system to steer the marine vessel. The term "autopilot system" refers to an application program that may automatically control the steering of the marine vessel. The application program may be stored and executed by the computing system 100. At step 320, the MFD 199 receives the type of navigation pattern from the user. For example, the navigation pattern may be a circle, square, arbitrary curve, or any other pattern programmed into the computing system 100. As such, the navigation pattern may be a predetermined pattern that is stored in the computing system 100.

At step 330, the MFD 199 receives a center of turn from the user. The center of turn is the geographical reference point for the navigation pattern. In the case of a circle or other symmetrical navigation pattern, the center of turn may be the actual center of the pattern. However, for other navigation patterns, such as a zig-zag shape, the center of turn may be a point that the navigation pattern passes through.

At step 340, the MFD 199 displays the selected navigation pattern on the display 105. In one implementation, the navigation pattern is displayed as an overlay on an existing navigation chart, thereby displaying the geographical location of the navigation pattern. For example, a circular navigation pattern may be overlaid on a radar chart. In another implementation, the MFD 199 may also display parameters regarding the navigation pattern. Since the navigation pattern to be travelled by the vessel is displayed in advance, the user can determine if the navigation pattern is acceptable. For example, if there were an obstacle along the navigation pattern, the user may change the navigation pattern or its parameters to avoid the obstacle.

At step 350, the user is given the option to modify the type of the navigation pattern or its parameters. If the user chooses to modify the type of the navigation pattern or its parameters, process 300 proceeds to step 360. If the user chooses to not modify the type of the navigation pattern or its parameters, process 300 proceeds to step 370. At step 360, the MFD 199 receives a modification of the type of the navigation pattern or its parameters from the user. The navigation pattern parameters may include, but are not limited to, center of turn, turn radius, turn angle, straight line length, turn repetitions, direction in which to repeat the turn and turn direction. All of the parameters may not be applicable for every navigation pattern. In one implementation, the user may input the navigation pattern parameters by selecting an icon for the desired parameter and specifying the desired value. In another implementation, the user may use the display of the navigation pattern to "drag" the desired parameter into place. For example, on a touchscreen displaying a circular navigation pattern, the user may use two fingers to touch the circle, and then increase or decrease the circle radius by pinching or widening his or her fingers. After step 360, the process 300 returns to step 340 to once again display the updated navigation pattern. At step 370, the MFD 199 will display the final navigation pattern on display 105.

The final navigation pattern corresponds to the navigation route that the marine vessel may follow in the future. In one implementation, the marine vessel may be steered along the navigation pattern by the autopilot system. The autopilot system may begin steering the marine vessel after the user commands it to do so (not shown in FIG. 3).

Figure 4:
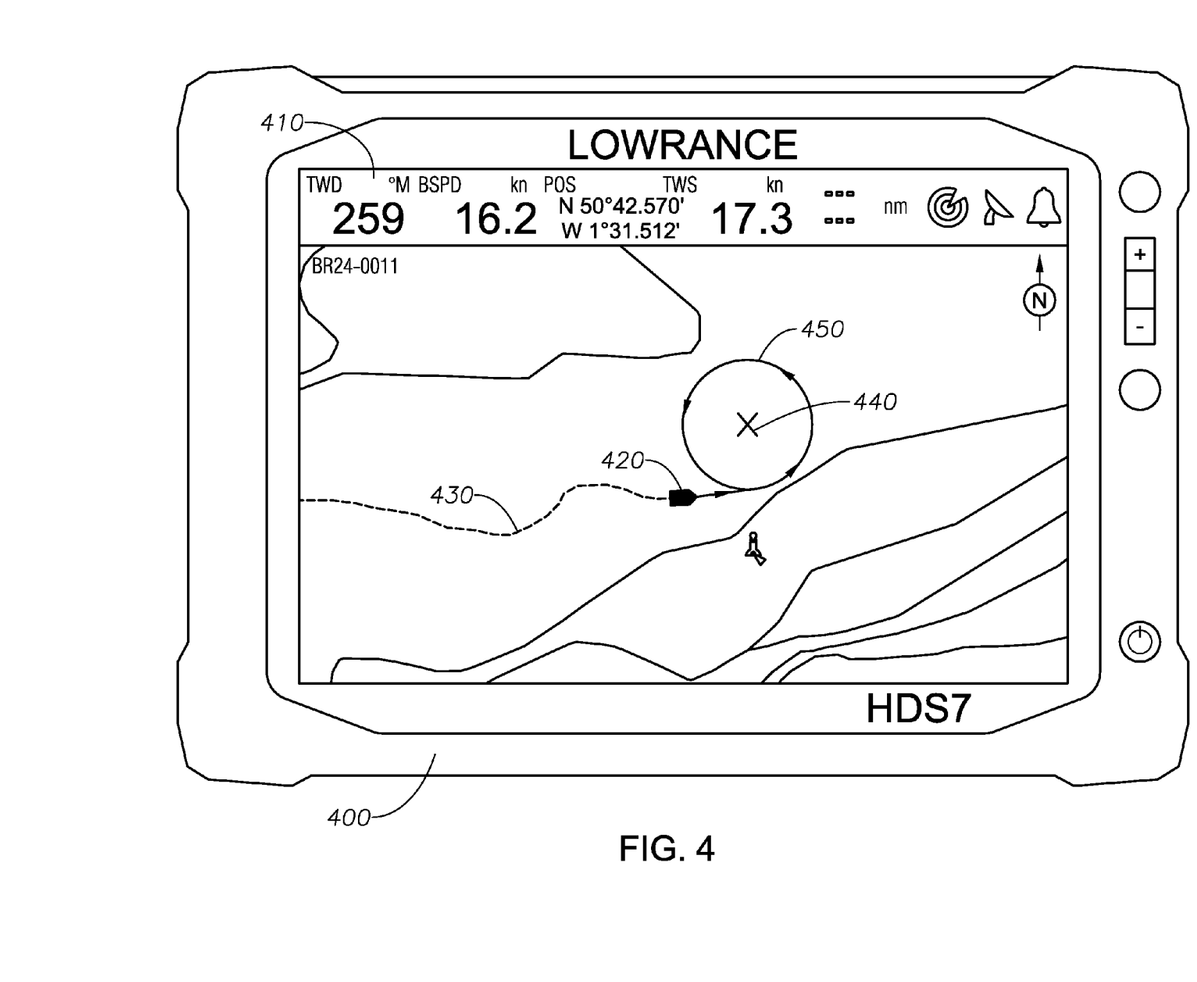
FIG. 4 illustrates a schematic diagram of a multi-function display displaying a circular navigation pattern in accordance with implementations described herein.

FIG. 4 illustrates a display of a navigation chart overlaid with a circular navigation pattern in accordance with one implementation described herein. The MFD 400 displays a navigation chart on a display 410. The navigation chart may contain a variety of navigational data, including, but not limited to, current bearing, current speed, current geographical coordinates, radar data, sonar data, and other information useful for marine navigation. The MFD 400 may also display the marine vessel 420 on the display 410. In addition, the MFD 400 may display the historical track 430 of the marine vessel. The historical track 430 indicates the route that has been travelled by the marine vessel. During and after the process 300, the navigation pattern 450 may be displayed by MFD 400 on display 410. The navigation pattern 450 may be overlaid on the navigation chart, i.e., it can be toggled on or off the display 410. In one implementation, the navigation pattern 450 has arrows indicating the direction of travel on the navigation pattern. The MFD 400 may also display the center of turn 440 or other navigation pattern parameters (not shown) on display 410.

Figure 5:
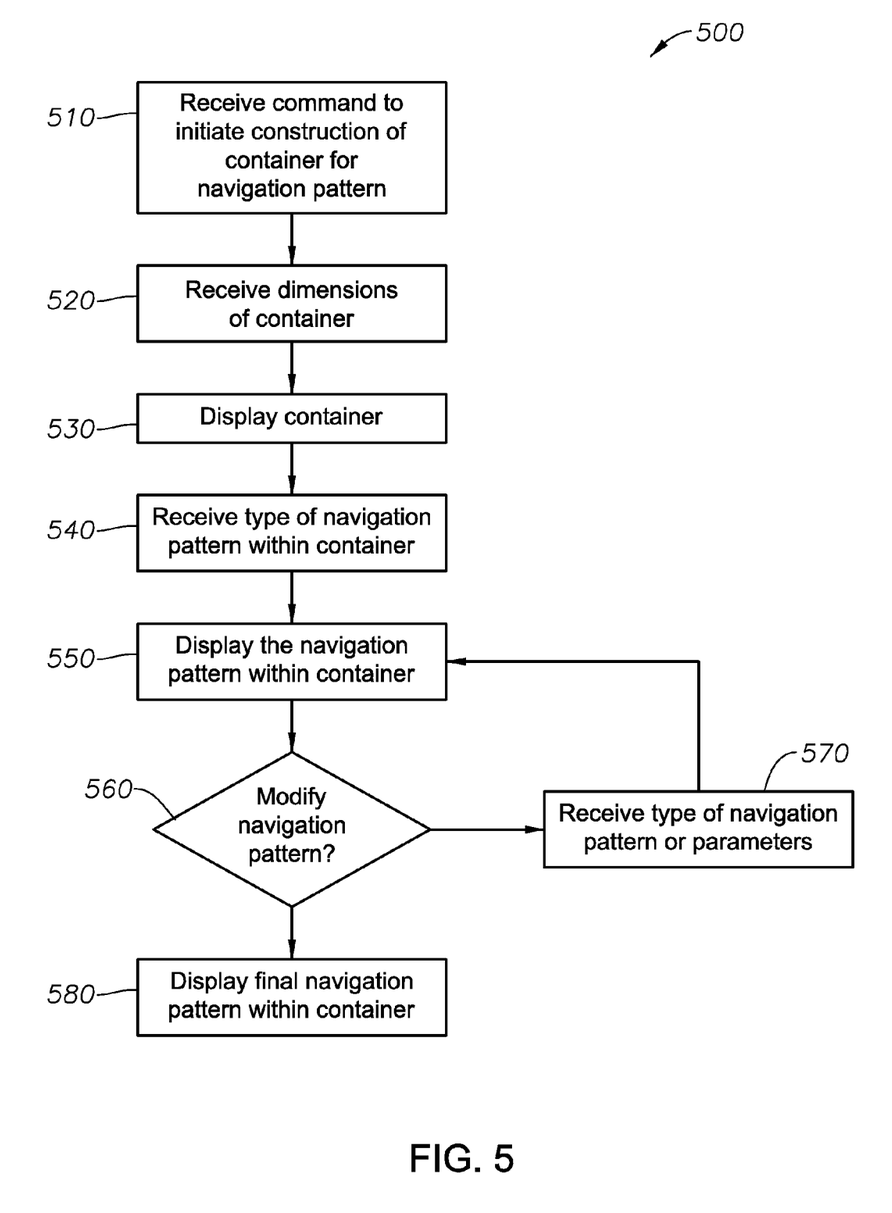
FIG. 5 is a flow diagram for creating and displaying a navigation pattern within a container in accordance with implementations described herein.

FIG. 5 is a flow diagram for method 500 for displaying a navigation route to be travelled by a marine vessel in accordance with another implementation described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 510, the MFD 199 receives a command from a user to initiate construction of a navigation pattern within a predetermined area. This predetermined area may be referred to as a "container" or an "outline".

At step 520, the MFD 199 receives the dimensions and location of the outline that will be filled with a navigation pattern. For example, the user may indicate the location and dimensions of the container by clicking and dragging a cursor on a navigation chart displayed on display 105. In one implementation, the container or outline may be in the shape of a box. The user may click at one corner of a box and drag the cursor to the opposite corner of the box. This implementation may be used with a touchscreen. In another implementation, the user may select an icon indicating the desired shape of the outline. The user may then position the selected shape either on a navigation chart for geographical reference or by entering geographical coordinates.

At step 530, the MFD 199 displays the outline on display 105. The outline may be overlaid on a navigation chart.

At step 540, the MFD 199 receives the type of navigation pattern to be displayed inside the outline or container. The navigation pattern may a box search, in which the pattern consists in repeated up and down segments across the entire container, or a spiral pattern, or any other regular pattern that may be reproduced throughout the entire container. Examples of various navigations patterns are shown on FIG. 7.

At step 550, the MFD 199 displays the selected navigation pattern on display 105. The MFD 199 may automatically fill the entire outline or container by regularly reproducing the selected navigation pattern throughout the outline or container. In this manner, the user can easily produce a complex route throughout a large area.

In one implementation, the MFD 199 may display navigation pattern parameters on display 105. These parameters may include any dimensions or orientations that affect the geometry of the pattern within the outline or container. For example, the parameters may include, but are not limited to, turn radius, box search density, turn direction, and straight path segment length. At step 560, the user is given the option to modify the type of the navigation pattern inside the container or its parameters. If the user chooses to modify the type of navigation pattern or its parameters, process 500 proceeds to step 570. If the user chooses to not modify the type of the navigation pattern or its parameters, process 500 proceeds to step 580.

At step 570, the MFD 199 receives a modification to the type of the navigation pattern or its parameters. The modification may also include a modification to the size or shape of the container or outline. After step 570, process 500 proceeds to step 550 to display the updated navigation pattern and/or outline. At step 580, the MFD 199 displays the final navigation pattern inside the container or outline on display 105. The final navigation pattern may be used by the user to steer the marine vessel. In one implementation, the marine vessel may be automatically steered along the navigation pattern by the autopilot system.

Process 500 may provide some of the benefits of process 300. In addition, process 500 allows the creation of complex navigation patterns inside a given area. By automatically filling in a given area with a regular navigation pattern, process 500 provides an easy way to set up a navigation route. For example, when searching an area of a body of water, a user may require a regular route that will not leave any gaps in coverage of the area. An automatically generated navigation pattern may easily fulfill these requirements.

Figure 6:
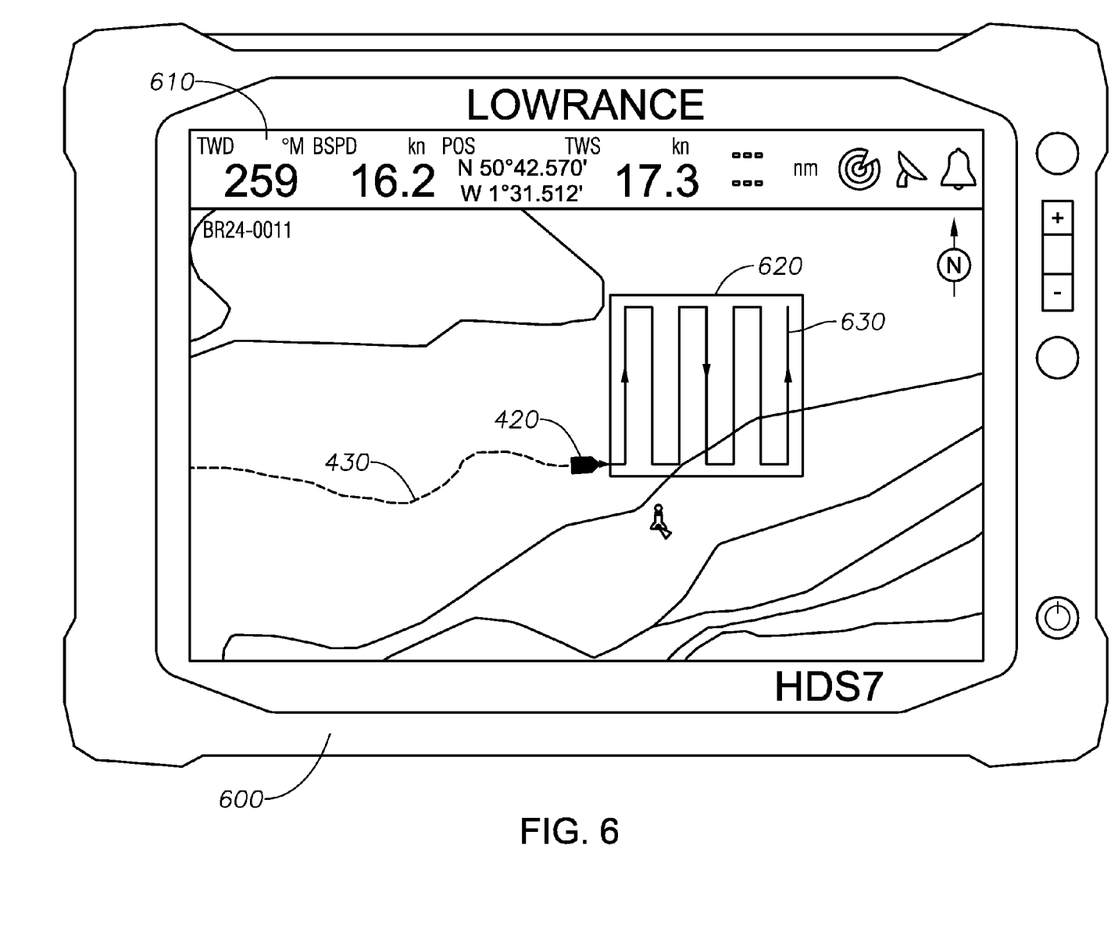
FIG. 6 illustrates a schematic diagram of a multi-function display displaying a navigation pattern within a container in accordance with implementations described herein.
Figure 7:
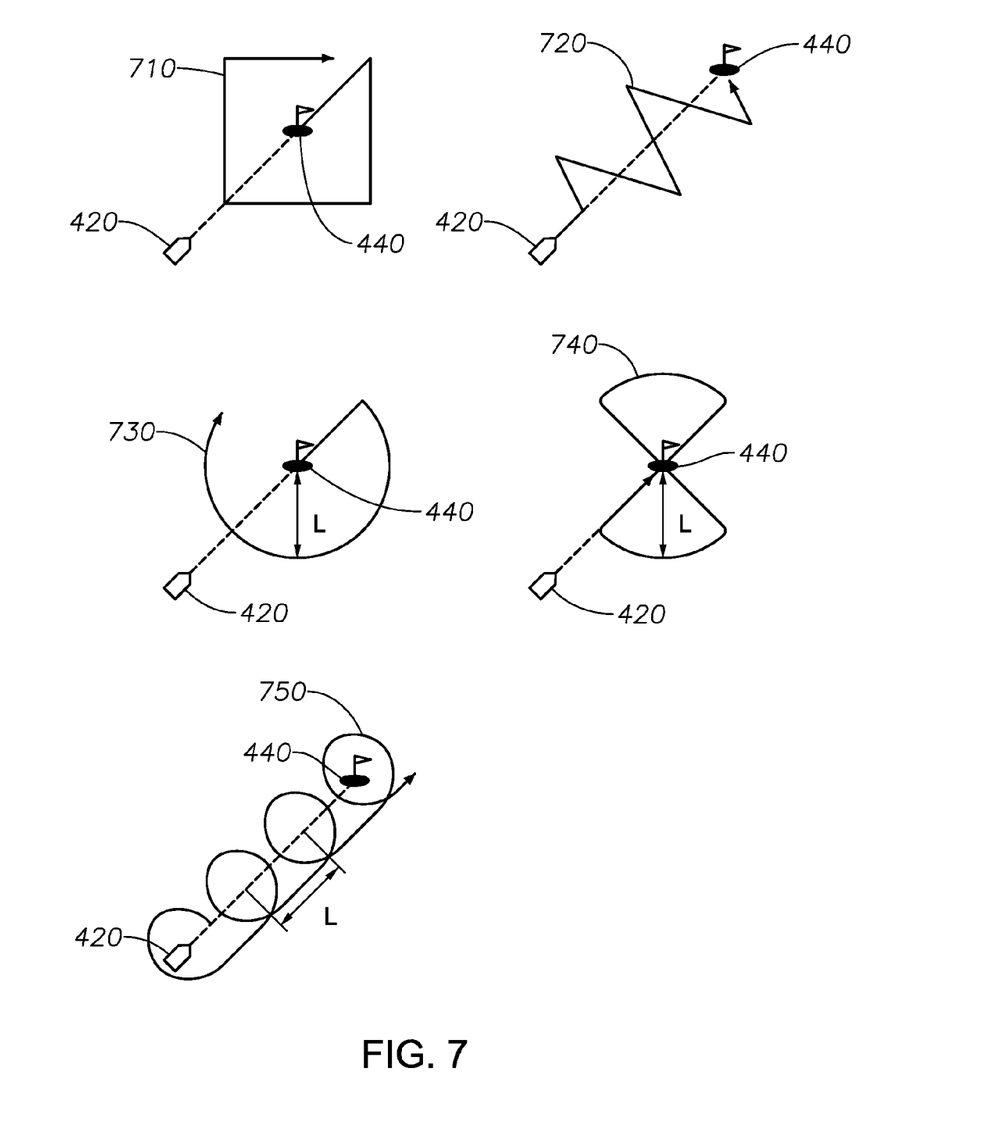
FIG. 7 illustrates a schematic diagram of several types of navigation patterns in accordance with implementations described herein.

FIG. 6 illustrates a display of a navigation pattern within a container or an outline in accordance with various implementations described herein. MFD 600 has a display 610 displaying a navigation chart. The navigational chart may contain a variety of useful marine navigation data. The MFD 600 also displays the marine vessel 420, as well as the vessel's historical track 430. The MFD may display, as an overlay on the navigation chart, a container or outline 620 and a navigation pattern 630 within the container. The MFD 600 may display the container or outline 620 and navigation pattern 630 during or after setting up a navigation route according to process 500. In one implementation, the navigation pattern 630 has arrows indicating the direction of travel. The MFD 600 may also display navigation pattern parameters.

As briefly mentioned above, FIG. 7 illustrates a number of possible navigation patterns. There are five navigation patterns illustrated in FIG. 7, but many other patterns may be programmed into the computing system 100. Each pattern shows a vessel 420 and a center of turn 440. The label "L" is merely to indicate the presence of navigation pattern parameters, such as radius. Navigation pattern 710 depicts a square pattern starting at the opposite corner from the vessel's current location. Navigation pattern 720 depicts a zig-zag pattern. Navigation pattern 730 shows a portion of a circular pattern. Navigation pattern 740 depicts a rough figure-eight pattern. Navigation pattern 750 indicates a series of loops.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying a route to be travelled by a marine vessel on a computer screen, the method comprising:
   receiving a selection of an outline from a set of multiple outlines having various shapes, the selected outline being configured to contain a navigation pattern that corresponds to the route;
   receiving a command to generate the selected outline at a geographical location;

displaying the selected outline on the computer screen at the geographical location on a navigation chart such that the outline is displayed on the navigation chart;

receiving a command selecting a navigation pattern for inside the selected outline, wherein the navigation pattern is selected from a set of predetermined navigation patterns, each navigation pattern having predetermined dimensions;

determining a dimension for the navigation pattern such that it fits within the selected outline such that the selected outline is substantially filled by the navigation pattern;

displaying the navigation pattern inside the selected outline on the computer screen such that the navigation pattern is displayed on the navigation chart;

receiving a request to modify the dimensions of the outline while the outline and the navigation pattern are displayed on the navigation chart and with respect to a current zoom level of the navigation chart, wherein receiving the request to modify the dimensions of the outline comprises receiving the request from a user to the outline via a touchscreen;

determining a second dimension for the navigation pattern such that it fits within the modified outline such that the modified outline is substantially filled by the navigation pattern; and causing modification of the displayed outline and the displayed navigation pattern with respect to the navigation chart such that the dimensions of the outline and the navigation pattern change while the current zoom level of the navigation chart does not change, wherein causing modification of the displayed outline and the displayed navigation pattern comprises causing modification while the user interacts with the touchscreen.

2. The method of claim 1, wherein the navigation pattern is displayed as an overlay.

3. The method of claim 1, wherein the outline is a square, a rectangle, a circle or a triangle.

4. The method of claim 1, further comprising:
receiving a command to move the outline to a second geographical location; and
displaying the outline at the second geographical location on the computer screen.

5. The method of claim 1, further comprising:
receiving a request to modify one or more parameters of the navigation pattern; and
displaying the navigation pattern based on the one or more modified parameters.

6. The method claim 1 further comprising displaying a historical route travelled by the marine vessel on the navigation chart along with the outline and the navigation route.

7. A non-transitory computer-readable medium having stored thereon computer-executable instructions which, when executed by a computer, cause the computer to:

receive a selection of an outline from a set of multiple outlines having various shapes, the selected outline being configured to contain a navigation pattern that corresponds to the route;

receive a command to generate the selected outline at a geographical location;

display the selected outline on a computer screen at the geographical location on a navigation chart such that the outline is displayed on the navigation chart;

receive a command selecting a navigation pattern for inside the selected outline, wherein the navigation pattern is selected from a set of predetermined navigation patterns, each navigation pattern having predetermined dimensions;

determine a dimension for the navigation pattern such that it fits within the selected outline such that the selected outline is substantially filled by the navigation pattern;

display the predetermined navigation pattern inside the selected outline on the computer screen such that the navigation pattern is displayed on the navigation chart;

receive a request to modify the dimensions of the outline while the outline and the navigation pattern are displayed on the navigation chart and with respect to a current zoom level of the navigation chart, wherein receiving the request to modify the dimensions of the outline comprises receiving the request from a user to the outline via a touchscreen;

determine a second dimension for the navigation pattern such that it fits within the modified outline such that the modified outline is substantially filled by the navigation pattern; and cause modification of the displayed outline and the displayed navigation pattern with respect to the navigation chart such that the dimensions of the outline and the navigation pattern change while the current zoom level of the navigation chart does not change, wherein causing modification of the displayed outline and the displayed navigation pattern comprises causing modification while the user interacts with the touchscreen.

* * * * *